UNITED STATES PATENT OFFICE.

LORENZ ACH, OF MANNHEIM, GERMANY, ASSIGNOR TO C. F. BOEHRINGER & SOEHNE, OF MANNHEIM-WALDHOF, GERMANY.

AROMATIC AMIDO-ALDEHYDES AND PROCESS OF MAKING SAME.

SPECIFICATION forming part of Letters Patent No. 676,862, dated June 25, 1901.

Application filed January 21, 1899. Serial No. 702,955. (Specimens.)

*To all whom it may concern:*

Be it known that I, LORENZ ACH, a citizen of the Empire of Germany, residing at Mannheim, in the Empire of Germany, have invented certain new and useful Improvements in Aromatic Amido-Aldehydes and Processes of Making the Same; and I do hereby declare the following to be a full, clear, and exact description of the invention, such as will enable others skilled in the art to which it appertains to make and use the same.

This invention relates to the preparation of amido-aldehydes, and in particular the amido-aldehydes which are derivatives of aromatic series.

Pellizari has shown in *Gazetta Chimica Italiana*, Vol. 17, page 412, *et seq.*, that products of addition may be formed from alloxan and aromatic bases, and, further, by acting on these products of addition with alkalies he obtained acids which were poorer by one atom of carbon and one atom of nitrogen than the said products of addition. Now I have discovered in the course of my researches with reference to these compounds that both the addition products and the derivative acids may be converted into aromatic amido-aldehydes if they are heated with sulfuric acid or its equivalent, the conversion being attended by loss of oxygen and nitrogen. Thus, for example, para-dimethyl-amido-benzaldehyde may be obtained if the product of addition of dimethyl-anilin and alloxan—namely, dimethyl-anilalloxan ($C_{12}H_{13}N_3O_4$) described in *Gazetta Chimica Italiana*, Vol. 17, page 417—or the acid $C_{11}H_{12}N_2O_3$ derived therefrom be heated with sulfuric acid. Under this process the amido-aldehydes are first obtained in sulfuric-acid solution from the free aldehydes and may be readily separated by neutralization and subsequent extraction with ether or the like. This new process leads not only to the primary, but also to the secondary and tertiary amido-aldehydes and is susceptible of a very wide, extensive, and general application. It has accomplished this object when used in connection with all the benzene derivatives thus far treated. By varying the degree of concentration, the temperature, and proportions of the sulfuric acid in accordance with the nature of the starting material employed the correct conditions for obtaining the amido-aldehydes in the most advantageous and economical manner are readily established.

My invention accordingly, broadly considered, consists in the treatment of the above products of addition or the derivative acids with heated sulfuric acid or its equivalent.

My invention, moreover, consists in such steps, features, and details of operation as will be set forth in the specification and pointed out in the claims.

In order to enable those skilled in the art to carry out my invention, I will now describe a number of examples which I consider the preferred embodiment of the said invention.

1. *Preparation of para-dimethyl-amido-benzaldehyde (a) from the acid $C_{11}H_{12}N_2O_3$.*—One part of this acid is rapidly introduced into five parts of sulfuric acid of the specific gravity 1.8 which has been heated to 155° centigrade. The introduction is accompanied by agitation or stirring. The acid goes into solution attended by a violent evolution of gases. If, as I prefer, the temperature of the mixture is maintained at from 155° to 160° centigrade for ten minutes, the reaction will be completed at the expiration of that time, this completion of the reaction being indicated by the cessation of the evolution of gas. The solution so formed is then poured into ten parts, by volume, of cold water and neutralized with an alkali, such as soda. The resultant para-dimethyl-amido-benzaldehyde is then immediately separated in the form of shining foliated crystals. The crystals are separated by decanting or siphoning off the mother-liquor. The crystals are then taken up with ether, whereby they are extracted or separated from the portion of the liquor still adhering to them. The reaction proceeds according to the equation:

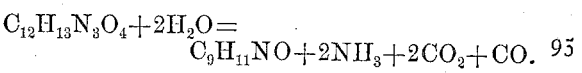

$$C_{12}H_{13}N_3O_4 + 2H_2O = C_9H_{11}NO + 2NH_3 + 2CO_2 + CO.$$

The yield is approximately theoretical. The degree of concentration of the sulfuric acid employed in this process may be varied greatly, although I find a sulfuric acid having a specific gravity between 1.5 and 1.84 gives the best results.

(b) From dimethyl-anilalloxan: Instead of the acid $C_{11}H_{12}N_2O_3$ the dimethyl-anilalloxan, from which it is derived, may be employed in the process just described. The proportions, steps, and course of the reaction are substantially the same, and the resultant product is again para-dimethyl-amido-benzaldehyde. The reaction proceeds according to the equation:

$$C_{11}H_{12}N_2O_3 + H_2O = C_9H_{11}NO + NH_3 + CO_2 + CO.$$

*2. Preparation of para-diethyl-amido-benzaldehyde.*—One part of diethyl-anilalloxan is introduced into five parts of sulfuric acid of the specific gravity 1.8 while stirring, the sulfuric acid having been heated to 155° centigrade. Solution takes place attended by a violent evolution of gas. After the lapse of ten minutes the solution is poured into ten parts of cold water, (preferably at a temperature of 10° centigrade.) The whole is then neutralized by an alkali, such as soda. The resultant aldehyde is then taken up with ether. The ether extract is then subjected to evaporation or allowed to evaporate, when the para-diethyl-amido-aldehyde remains as a rapidly-hardening oil, which has all the known characteristics set forth in *Berichte der Deutschen Chemischen Gesellschaft*, Vol. 19, page 369. The reaction proceeds according to the equation:

$$C_{14}H_{17}N_3O_4 + 2H_2O = C_{11}H_{15}NO + 2NH_3 + 2CO_2 + CO.$$

The same result would follow if in lieu of the diethyl-anilalloxan the acid obtained therefrom by alkalies and referred to in the introductory part of this specification were employed. The proportions, steps, and course of the reaction would be substantially the same and will hence be sufficiently understood by those skilled in the art to which this invention pertains.

*3. Preparation of para-methyl-amido-benzaldehyde.*—One part of methyl-anilalloxan is introduced into five parts of sulfuric acid of the specific gravity 1.8 and heated to 155° centigrade while stirring. After the lapse of about seven minutes the resulting solution is poured into ten parts of cold water. The whole is then neutralized with alkali, such as soda, and the resultant aldehyde is extracted with ether, as in the preceding examples. After the evaporation of the ether therefrom the methyl-amido-benzaldehyde remains as an oil, which gradually solidifies in crystalline form. The reaction proceeds according to the equation:

$$C_{11}H_{11}N_3O_4 + 2H_2O = C_8H_9NO + 2NH_3 + 2CO_2 + CO.$$

It is purified by distilling with superheated steam. Under this treatment the aldehyde goes over in the form of a yellow oil, which rapidly crystallizes in the form of small lustrous plates or scales. It is readily soluble even in the cold in the usual organic solvents, but less so in ligroin. From water it crystallizes in the form of rhombic plates having the melting-point 60° to 61° centigrade. Its formula is:

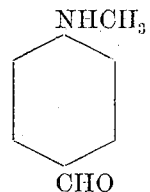

In this case also the derived acid ($C_{10}H_{10}N_2O_3$) may be employed with equal success in place of the methyl-anilalloxan, the proportions, course of the reaction, and result being in all respects substantially the same.

*4. Preparation of para-ethyl-amido-benzaldehyde.*—One part of ethyl-anilalloxan is introduced into seven parts of sulfuric acid of the specific gravity 1.8, heated to 160° centigrade, the acid being stirred at the same time. The evolution of gas which takes place ceases at the end of about seven minutes. The resultant solution is then poured into ten parts of water of a temperature of about 10° centigrade. The whole is then again neutralized with an alkali, such as soda, and the aldehyde taken up with ether, as in the preceding examples. After the ether has evaporated off the aldehyde remains as a rapidly-solidifying oil. This oil is then distilled with superheated steam, the aldehyde going over and collecting as a yellow oily substance which crystallizes rapidly on cooling. The reaction takes place according to the equation:

$$C_{12}H_{13}N_3O_4 + 2H_2O = C_9H_{11}NO + 2NH_3 + 2CO_2 + CO.$$

Para-ethyl-amido-benzaldehyde is very readily soluble in most solvents, but soluble with difficulty in water and ligroin. On treating a methyl-alcoholic solution of the aldehyde with water it is obtained in the form of fine needles. It melts at 81° to 82° centigrade to an oily substance which rapidly resolidifies on cooling. It is actinic, readily assuming a darker color when exposed to light. Its formula is:

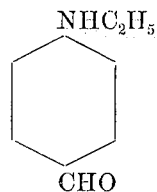

Here again the derivative acid of the ethyl-anilalloxan may be employed as the starting material, giving substantially the same results as the alloxan.

*5. Preparation of paraämido-benzaldehyde.*—One part of the acid $C_9H_8N_2O_3$, which has been described in *Gazetta Chimica Ital-*

*iana*, Vol. 17, page 413, is rapidly introduced into nine parts of sulfuric acid while constantly agitating or stirring the same. The sulfuric acid employed is preferably of the specific gravity 1.83 and must be previously heated to from 160° to 170° centigrade. The ensuing evolution of gases is terminated after from ten to fifteen minutes, and thereupon the mixture is poured into about ten parts, by volume, of water. On gently warming the whole a clear solution results, which on further heating becomes continually lighter in color. On cooling the solution it again acquires a darker color until finally a dark-red salt is separated. The reaction takes place according to the equation:

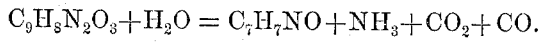

To obtain the free aldehyde, the hot solution is neutralized with an alkali, preferably soda, and the aldehyde is again extracted from the mixture with ether. On evaporating the ether the paraämido-benzaldehyde remains in the form of a rapidly-crystallizing oily substance. This aldehyde is at first soluble in water, but soon changes to an insoluble compound by polymerization. Its formula is:

Instead of the acid the anilalloxan from which it is derived may be employed, and here again the steps, proportions, and course of the reaction are substantially the same as when the acid is used as a starting material.

6. *Preparation of paraämido-meta-toluyl-aldehyde.*—One part of ortho-toluidyl-alloxan is introduced into seven parts of sulfuric acid of the specific gravity 1.8, which has been heated to 160° centigrade. The introduction is accompanied by stirring and gives rise to strong foaming and after a short time solution takes place. The whole is poured into ten parts of water of a temperature of about 10° centigrade. The mixture is again neutralized, preferably with soda, and the resultant aldehyde is extracted with ether. After evaporating the ether the paraämido-meta-toluyl-aldehyde remains as an oily substance, which solidifies to a crystalline mass within a few minutes. The reaction takes place according to the equation:

This aldehyde softens somewhat on heating over 90° centigrade and melts at from 99° to 100° centigrade. It is soluble in alcohol and ether, with greater difficulty in hot water. It readily changes to a polymeric insoluble form, and in other respects it exhibits great similarity with the paraämido-benzaldehyde, as described in German Patent No. 87,255 to Geigy and Cie, of Basle. Its formula is:

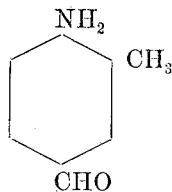

Evidently we may in this case again substitute the derivative acid obtained from this alloxan by treating it with alkalies, according to Pellizari for the aldehyde, as a starting material in the above process, the proportions, conditions, and course of the reaction being substantially the same.

7. *Preparation of paraämido-meta-methoxy-benzaldehyde.*—One part of anisidil-alloxan is introduced into and agitated with seven parts of sufuric acid of specific gravity 1.8, which has been heated to 160° centigrade. After the lapse of about five minutes the resultant solution is poured into ten parts of water of a temperature of about 15° centigrade, and the whole is again neutralized with an alkali, such as soda. The resultant aldehyde is again extracted with ether. After evaporating the ether from the extract the aldehyde remains in the form of a slightly-colored crystalline mass, which, however, rapidly becomes dark red. The reaction takes place according to the equation:

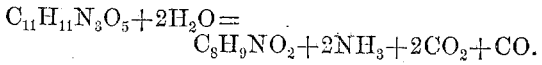

The aldehyde is purified and bleached by dissolving in warm benzene, in which the coloring-matter is soluble only with difficulty. Petroleum-ether is then added in sufficient quantity to completely precipitate the aldehyde. The paraämido-meta-methoxy-benzaldehyde so precipitated forms yellow acicular crystals, which melt at 101° to 102° centigrade. This aldehyde is very sensitive to light. Its formula is:

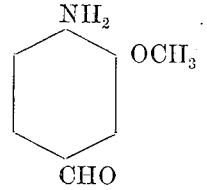

In this case also the derivative acid, according to Pellizari, may be substituted for the alloxan as the starting material in the above process, the results being substantially the same.

The process of preparing aromatic amido-benzaldehydes by treating an acid derived from a product of addition of alloxan and an aromatic base, according to Pellizari, with a mineral acid, such as sulfuric acid, while hereinbefore described, is not herein claimed, being covered in the claims of my application Serial No. 735,088, filed October 28, 1899, which is a divisional application from this application.

What I claim, and desire to secure by Letters Patent of the United States, is—

1. The process of preparing aromatic amidobenzaldehydes which consists in treating an addition product of alloxan and an aromatic base with a mineral acid.

2. The process of preparing aromatic amidobenzaldehydes which consists in treating an addition product of alloxan and an aromatic base with sulfuric acid.

3. The process of preparing aromatic amidobenzaldehydes which consists in heating an addition product of alloxan and an aromatic base with sulfuric acid.

4. The process of purifying aromatic amidobenzaldehydes which consists in extracting the same with ether and then evaporating the ether and distilling the residual aldehyde with superheated steam.

5. The process of preparing aromatic amidoaldehydes which consists in adding to heated sulfuric acid an addition product of alloxan and an aromatic base and stirring the whole, allowing to stand, and then pouring into water, all in the proportions, substantially as set forth.

6. The process of preparing aromatic amidoaldehydes which consists in adding to heated sulfuric acid an addition product of alloxan and an aromatic base, stirring the whole, allowing to stand, pouring into water, and finally neutralizing with alkali, all in the proportions, substantially as set forth.

7. The process of preparing aromatic amidobenzaldehydes which consists in adding to heated sulfuric acid an addition product of alloxan and an aromatic base, stirring, allowing to stand, pouring into water, then neutralizing with alkali and extracting the resultant new compound with ether.

8. The process of preparing aromatic amidobenzaldehydes which consists in adding to heated sulfuric acid an addition product of alloxan and an aromatic base, and stirring, allowing to stand, pouring into water, then neutralizing with alkali and extracting the resultant new compound with ether, then evaporating the ether and distilling the residual new compound with superheated steam.

9. The process of preparing aromatic amidobenzaldehydes which consists in heating an anil-alloxan with sulfuric acid.

10. The process of preparing aromatic amido-benzaldehydes which consists in heating an alkylized anil-alloxan with sulfuric acid.

11. The process of preparing aromatic amido-benzaldehydes which consists in adding an alkylized anil-alloxan to heated sulfuric acid and stirring and then after evolution of gas has ceased pouring the whole into water.

12. The process of preparing aromatic amido-benzaldehydes which consists in adding an alkylized anil-alloxan to heated sulfuric acid and stirring and then after evolution of gas has ceased pouring the whole into water, and finally extracting the new compound with ether.

13. The process of preparing aromatic amido-benzaldehydes which consists in adding an alkylized anil-alloxan to heated sulfuric acid and stirring and then after evolution of gas has ceased, pouring the whole into water, then extracting the resultant compound with ether and, finally distilling the same with superheated steam.

14. As a new chemical compound, para-amido-meta-methoxy-benzaldehyde, having the formula above given, which forms yellow acicular crystals which melt at 101° to 102°, centigrade, and which is sensitive to light.

In testimony whereof I affix my signature in presence of two witnesses.

LORENZ ACH.

Witnesses:
VICTOR FRITZ,
LEO BEENSCH.